United States Patent
Schulz

(10) Patent No.: US 6,511,042 B1
(45) Date of Patent: Jan. 28, 2003

(54) ELECTRICALLY CONTROLLED VALVE

(75) Inventor: Wolfgang Schulz, Bietigheim - Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/762,970

(22) PCT Filed: Apr. 28, 2000

(86) PCT No.: PCT/DE00/01341

§ 371 (c)(1),
(2), (4) Date: Apr. 5, 2001

(87) PCT Pub. No.: WO00/79163

PCT Pub. Date: Dec. 28, 2000

(30) Foreign Application Priority Data

Jun. 18, 1999 (DE) .......................................... 199 27 906

(51) Int. Cl.[7] .............................................. F16K 31/06
(52) U.S. Cl. .............................. 251/129.16; 251/129.21
(58) Field of Search ....................... 251/129.16, 129.21, 251/129.15

(56) References Cited

U.S. PATENT DOCUMENTS 3,921,670 A * 11/1975 Clippard, Jr. et al. ... 251/129.16
6,220,569 B1 * 4/2001 Kelly ................ 251/129.16 X

* cited by examiner

Primary Examiner—Kevin Lee
(74) Attorney, Agent, or Firm—Ronald E. Greigg

(57) ABSTRACT

A valve, in particular for tank venting in motor vehicles, having a short-circuit yoke (40), having at least one valve opening (42) and having a spring-loaded valve member (50) which cooperates for opening and closing the at least one valve opening (42) and which, forming a magnet armature of an electromagnet (13), is disposed between the short-circuit yoke (40) of the electromagnet (13) and a magnet core (15) of the electromagnet (13), wherein the valve member (50) is fastened to the short-circuit yoke (40) by means of a centering spring (60), which is fastened at at least two fastening points (71) each to the valve member (50) and at least two fastening points (70) to the short-circuit yoke and has at least two short spring arms (62) and at least two long spring arms (63), one each between a fastening point (70) on the valve member and a fastening point (71) on the short-circuit yoke, is characterized in that the short spring arms (62) extend in a curved meandering fashion.

4 Claims, 4 Drawing Sheets

ELECTRICALLY CONTROLLED VALVE

CROSS-REFERENCE TO RELATED APPLICATIONS

This application is a 35 USC 371 application of PCT/DE 00/01341 filed on Apr. 28, 2000.

BACKGROUND OF THE INVENTION

The invention relates to a valve, in particular for fuel tank venting in motor vehicles.

A valve of this kind is disclosed for instance in German Patent Disclosure DE 197 21 562 A1 or German Patent Disclosure DE 40 23 044 A1.

Such valves are used for regenerating adsorption filters for fuel vapor trapping systems for the fuel tank of vehicles. A problem with such valves is that the centering spring can break at high vibration accelerations, which occur in the vehicle especially when a motor is installed and at long valve strokes. The breakage point in most cases is located in the region of the short spring arms, adjacent to the fastening points of the centering spring on the valve member and on the annular gap yoke.

SUMMARY OF THE INVENTION

An object of the invention is to refine a valve of the generic type such that even upon a motor mounting of the valve and with the attendant high vibration accelerations, breakages of the centering spring are maximally averted.

In a valve of the type defined at the outset, this object is attained according to the invention by the characteristics set forth herein.

It has been found that by means of the meandering curved course of the short spring arms, a tendency to breakage of the centering spring, even in the region of the short spring arms, adjacent to the fastening points on the valve member and the short-circuit yoke, is decreased considerably.

Furthermore, by fastening the valve member to the short-circuit yoke by means of the centering spring and by means of the embodiment of the centering spring, an especially precise, frictionless guidance of the valve member in the short-circuit yoke/annular gap yoke is made possible, and canting during the clocked operation of the valve is effectively prevented. Without a centering spring of this kind, proper valve function would be impossible, since if the valve member acting as a magnet armature became canted in the annular gap yoke, magnetic saturation would occur at the point of the canting, which would prevent a uniform working motion of the valve member.

In an advantageous embodiment, it is provided that the short spring arms extend in an S-shaped curve.

The fastening of the centering spring to the valve member and to the short-circuit yoke is advantageously done by rivet connections.

BRIEF DESCRIPTION OF THE DRAWINGS

Further advantages and characteristics of the invention are the subject of the ensuing description and of the illustration of the exemplary embodiments in the drawings.

Shown in the drawings are.

DESCRIPTION OF THE EXEMPLARY EMBODIMENTS

Figure 1:
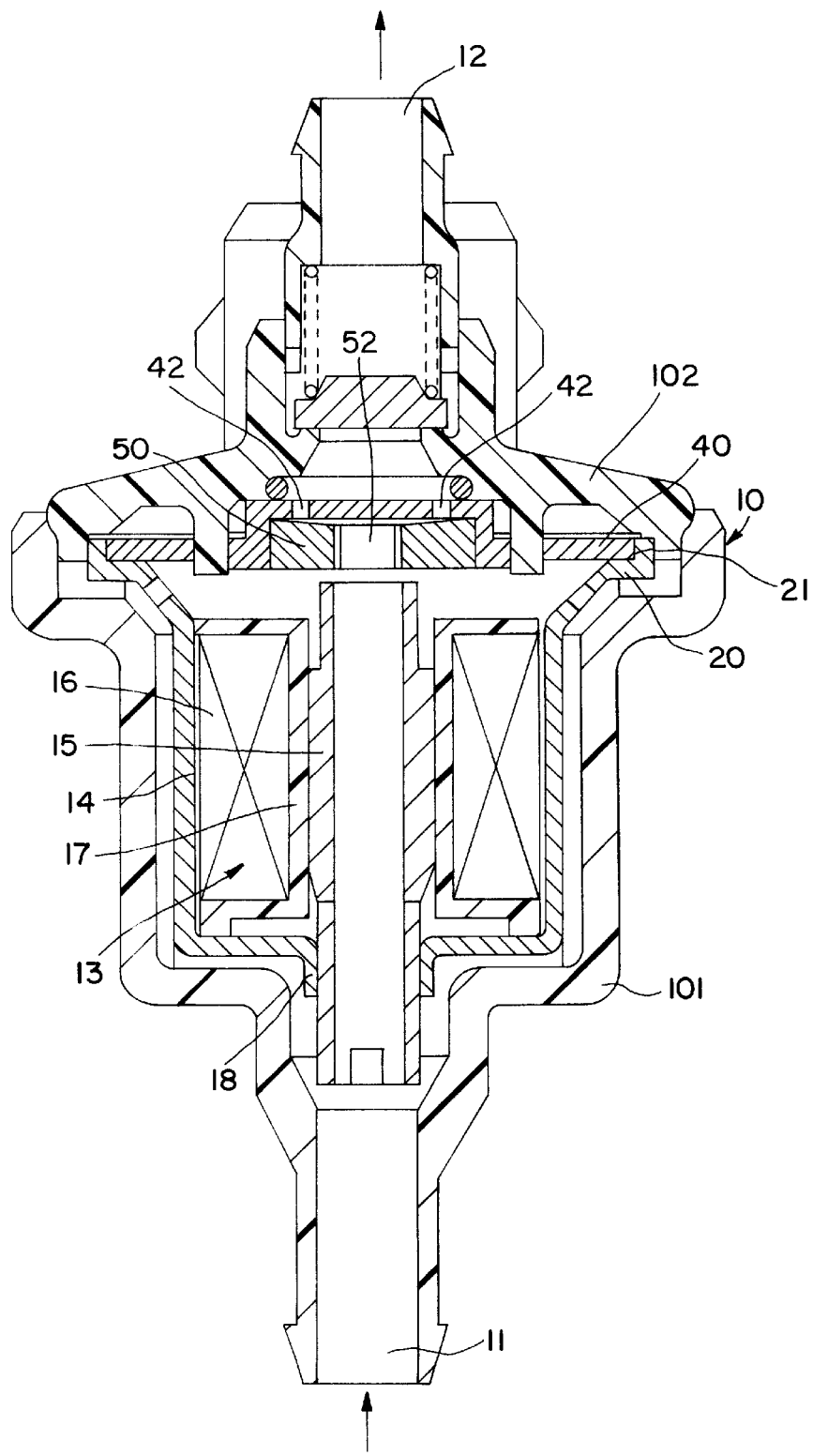
FIG. 1, schematically, a longitudinal section through a valve known from the prior art.

A tank venting valve, shown in longitudinal section in FIG. 1 and known from the prior art, as an exemplary embodiment of an arbitrary magnet valve. The magnet valve is used for the metered admixture of volatilized fuel, from the fuel tank of a mixture-compressing internal combustion engine (not shown) with externally supplied ignition into the engine, for instance into an intake tube, or in the case of direct gasoline injection directly into a cylinder of the engine. The valve is part of a fuel vapor trapping system, not shown in further detail, of an internal combustion engine. The structure and function of such fuel vapor trapping systems can be learned for instance from "Bosch Technische Unterrichtung Motormanagement Motronic" [Bosch Technical Instruction, Motronic Motor Management], 2nd Ed., August 1993, pp. 48 and 49. A tank venting valve and its function are found for instance in German Patent Disclosures DE 197 21 562 A1 and DE 196 11 886 A1 or DE 40 23 044 A1, which are hereby incorporated by reference.

A tank venting valve has a two-part valve housing 10, with one cup-shaped housing part 101 and one caplike housing part 102 that closes off the first housing part. The housing part 101 has an inlet neck 11 for connection to a venting stub of the fuel tank or to a reservoir, downstream of the fuel tanks, filled with activated charcoal for the volatilized fuel. The housing part 102 has an outlet neck for connection to the intake tube of the engine. The inlet neck 11 and the outlet neck 12 are disposed in alignment with one another, each axially, in the respective housing parts 101, 102. An electromagnet 13 is disposed in the interior of the cup-shaped housing part 101.

The electromagnet 13 has a cup-shaped magnet housing 14 with a coaxial, hollow-cylindrical magnet core 15 that penetrates the cup bottom and with a cylindrical exciter coil 16, which is seated on a coil carrier 17 that surrounds the magnet core 15 in the magnet housing 14. An outward-protruding threaded neck 18 with a female thread is embodied on the bottom of the magnet housing 14 and is screwed to a male-threaded portion of the hollow-cylindrical magnet core 15. The magnet core 15 can thus be displaced axially for adjustment purposes by being rotated in the magnet housing 14. The magnet housing 14 is coated with plastic all the way around on the thread, in order to compensate for thread tolerances on the magnet core 15 and/or on the threaded neck 18, and to prevent the magnet core 15 from going out of adjustment in the vehicle. The magnet core 15 is aligned with the inlet neck 11, so that the volatilized fuel flowing in here flows directly through the magnet core 15.

Figure 2:
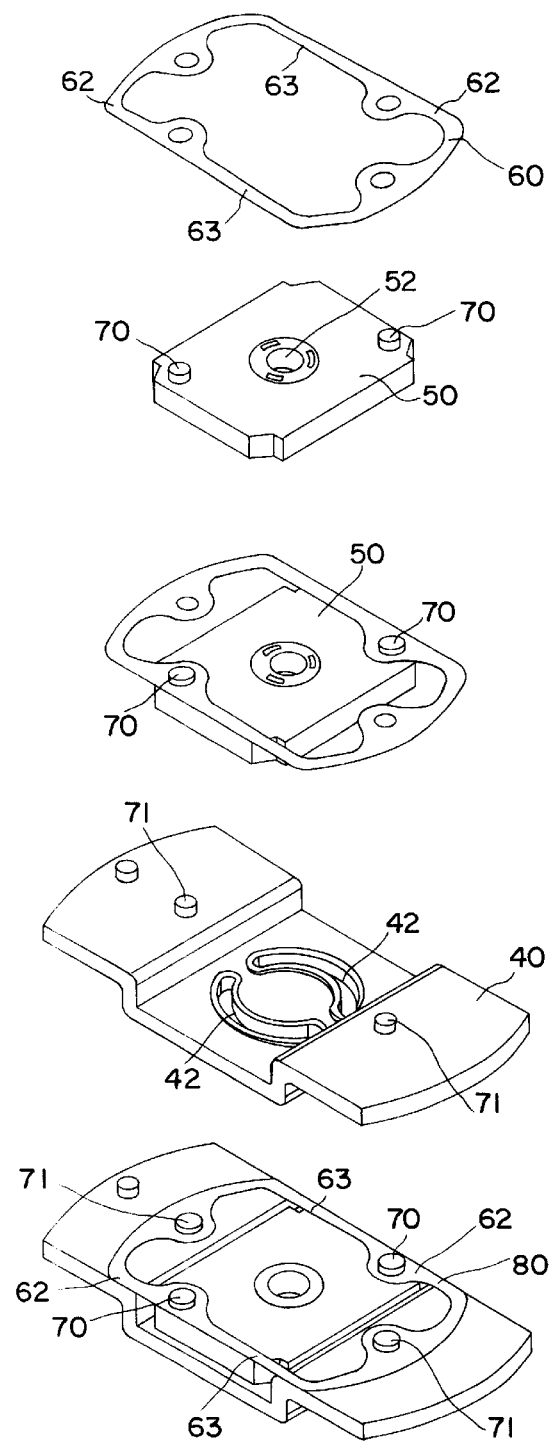
FIG. 2, in perspective, the fastening of the valve member to a short-circuit yoke by a centering spring in a valve known from the prior art.

The rim of the magnet housing 14 is angled outward to form an annular bearing flange 20, which on its end is bent over to form an axially protruding annular rib 21. A valve seat body forming the short-circuit yoke 40 of the electromagnet 13 is received in the bearing flange 20; it covers the magnet housing 14 and rests on its rim on the annular rib 21. As seen particularly in FIG. 2, in the annular gap yoke or short-circuit yoke 40, symmetrical, substantially semicircular curved gaps 42 are disposed as valve openings. The curved gaps 42 are closable by means of a valve member 50, which has the function of a magnet armature and is disposed between the short-circuit yoke 40 and the magnet core 15. An axial through opening 52 is disposed centrally in the valve member 50, coaxially with the hollow-cylindrical magnet core 15, and through this opening volatilized fuel arriving from the inlet neck 11 can reach the outlet neck 12 when the valve openings 42 are open. The valve member 50, made from magnetically conductive material, is fastened by means of a leaf-springlike centering spring 60 to the annular gap yoke 40 by rivet connections 70, 71; two rivet connections 70 each are disposed on the valve member 50, and two further rivet connections 71 are disposed on the annular gap yoke 40. The centering spring 60 has two short spring arms 62 and two long spring arms 63, which each represent the connection to the respective rivet connections 70 and 71.

Figure 3:
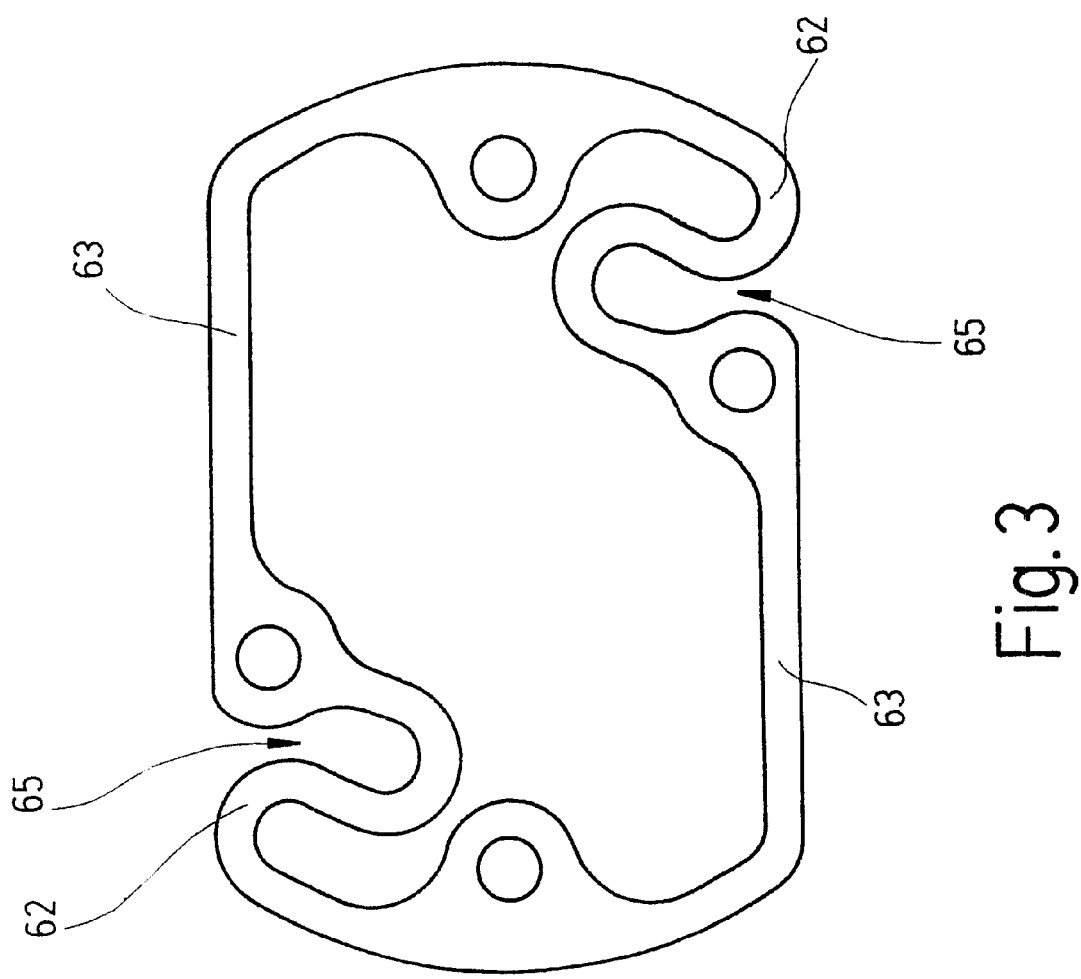
FIG. 3, a plan view on a centering spring according to the invention.
Figure 4:
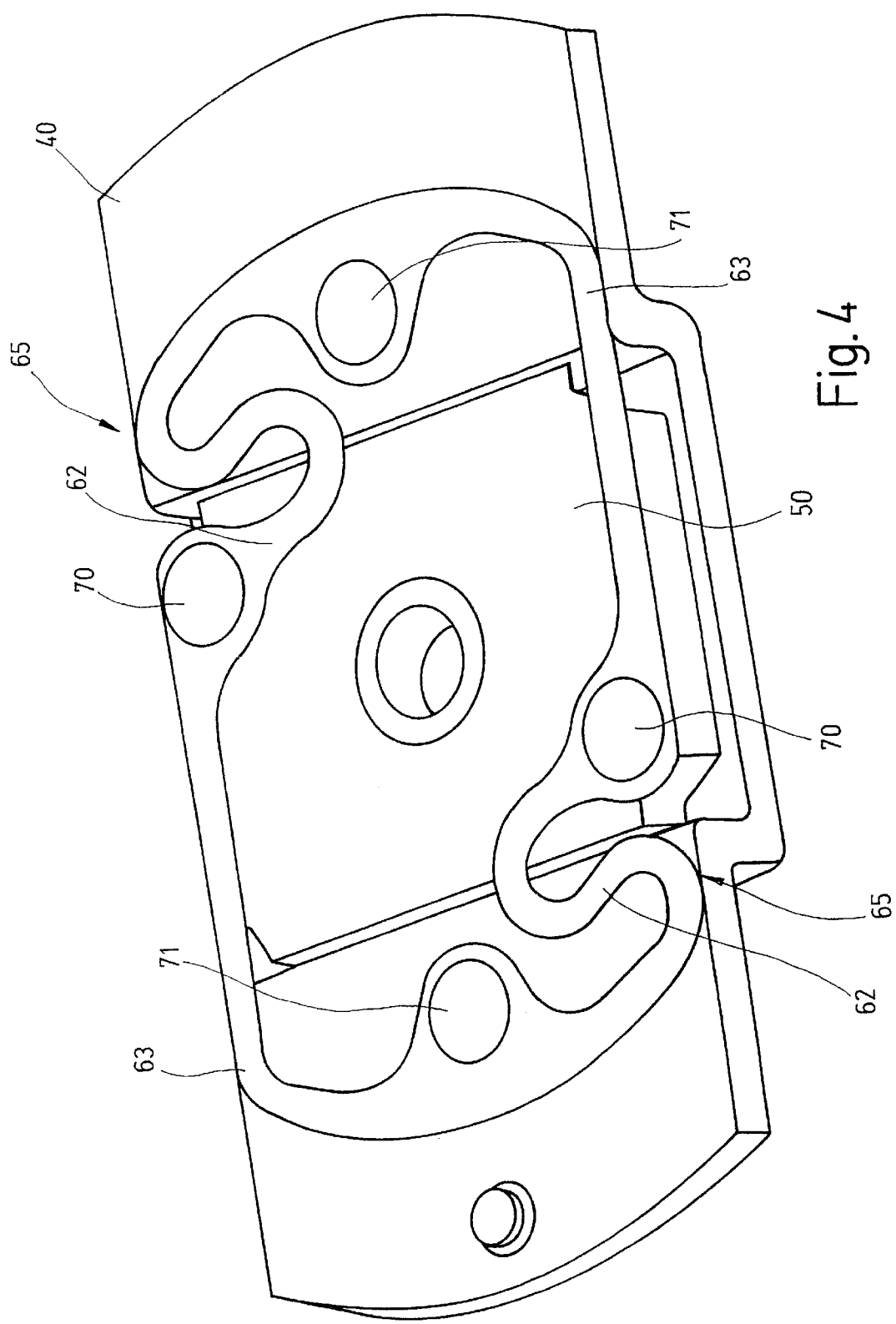
FIG. 4, in perspective, a short-circuit yoke and a valve member, fastened to the short circuit yoke by means of the centering spring shown in FIG. 3.

As a result of the load on the valve from vibration accelerations, of the kind that can occur especially upon motor mounting of the valve, breakage points can occur that are localized in particular adjacent to the fastening points 70 on the short spring arms 62. To avoid these breakage points, the short spring arms 62 have meanderingly curved arcs 65, for instance curved in an S shape as shown in FIGS. 3 and 4. As a result of this lengthening of the short spring arms 62, on the one hand a markedly longer working stroke for greater air throughputs is attained, and on the other this kind of centering spring 60 can be subjected to greater vibration accelerations in transverse directions, since these vibrations can fade especially advantageously in the S-shaped curved arcs 65. Furthermore, a centering spring 60 of this kind makes frictionless support of the valve member 50 in the short-circuit yoke/annular gap yoke 40 possible and in particular prevents canting during clocked operation of the valve and a resultant magnetic saturation that would prevent a uniform working motion of the valve member 50.

The foregoing relates to preferred exemplary embodiments of the invention, it being understood that other variants and embodiments thereof are possible within the spirit and scope of the invention, the latter being defined by the appended claims.

I claim:

1. A valve for fuel tank venting in motor vehicles, comprising a short-circuit yoke (40) with at least one valve opening (42), a spring-loaded valve member (50) which cooperates for opening and closing the at least one valve opening (42) which forms a magnet armature of an electromagnet (13), the valve member is disposed between the short-circuit yoke (40) of the electromagnet (13) and a magnet core (15) of the electromagnet (13), the valve member (50) is fastened to the short-circuit yoke (40) by a centering spring (60), which is fastened at at least two fastening points (71) to the valve member (50) and by at least two fastening points (70) to the short-circuit yoke and has at least two short spring arms (62) and at least two long spring arms (63), one each between a fastening point (70) on the valve member and a fastening point (71) on the short-circuit yoke, and the short spring arms (62) extend in a winding, side to side course.

2. The valve of claim 1, in which the short spring arms (62) extend in an S-shaped curve.

3. The valve of claim 1, in which the centering spring (60) is fastened to the short-circuit yoke (40) and to the valve member (50) by rivet connections.

4. The valve of claim 2, in which the centering spring (60) is fastened to the short-circuit yoke (40) and to the valve member (50) by rivet connections.

* * * * *